United States Patent [19]
Dey et al.

[11] Patent Number: 5,283,629
[45] Date of Patent: Feb. 1, 1994

[54] METHOD FOR ASSESSING A VERTEX RADIUS OF CURVATURE

[75] Inventors: Thomas W. Dey, Springwater; Jennifer A. LeBaron, Rochester, both of N.Y.

[73] Assignee: Eastman Kodak Company, Rochester, N.Y.

[21] Appl. No.: 860,632

[22] Filed: Mar. 30, 1992

[51] Int. Cl.⁵ .............................................. G01B 9/02
[52] U.S. Cl. .................................... 356/359; 356/360; 356/376
[58] Field of Search ............... 356/359, 360, 376, 72, 356/73

[56] References Cited
U.S. PATENT DOCUMENTS
4,958,931  9/1990  Tatian ............................. 356/360

Primary Examiner—Samuel A. Turner
Assistant Examiner—Robert Kim
Attorney, Agent, or Firm—Thomas H. Close

[57] ABSTRACT

A method for determining a vertex radius of curvature for an optical surface. The method comprises subjecting the optical surface to a classical collimation testing procedure, so that the optical surface simulates a paraboloid; and, subjecting the optical surface to a vertex focusing interferometric testing procedure, so that a vertex radius of the optical surface can be determined.

4 Claims, 7 Drawing Sheets

TABLE

RITCHEY - CHRETIEN
PRIMARY MIRRORS
(EXAMPLES)

|  | A | B |
|---|---|---|
| DIAMETER | 100 IN. | 200 IN. |
| F* | 2.1 | 1.4 |
| R | 420 | 560 |
| CONIC CONST (K) | -1.021 | -1.013 |
| ASPHERIC DEPARTURE* | 92 | 667 |
| APARABOLIC DEPARTURE* | 2.3 | 9.3 |

*BEST FIT PEAK-TO-VALLEY SURFACE DEPARTURE MEASURED IN WAVELENGTHS OF HELIUM-NEON LASER LIGHT AT 0.6328 MICROMETER WAVELENGTH.

FIG. 4

METHOD FOR ASSESSING A VERTEX RADIUS OF CURVATURE

FIELD OF THE INVENTION

This invention relates to a method for assessing a surface figure of an optical element, and in particular, to a method for determining a vertex radius of curvature of an optical surface.

INTRODUCTION TO THE INVENTION

Methods for assessing a surface figure, as characterized, for example, by a vertex radius of curvature R, a conic constant k, or, an algebraically related conic eccentricity $\epsilon$, of an optical element, for example, a primary mirror of a conventional telescope, are known.

One objective of such a method is to expedite a fabrication process of the optical element, so that, by way of, for example, standard polishing techniques, a method discerned actual surface parameter, $k_a$, can be compared to a desired or idealized surface figure, $k_i$, to an end of converging on an optimal null, $|k_a - k_i| = 0$.

Another objective of such a method is to discern an actual radius of curvature $R_a$, since an absolute difference of $R_a$ from a desired or idealized $R_i$ i.e., $|R_a - R_i|$, is a parameter $\Delta R$, the last a parameter directly proportional to a critical figure of merit for an optical element, namely, a wavefront focus error $\Delta W$ (i.e., $\Delta W \alpha \Delta R$).

Further particulars and illustrations of such assessing methods are disclosed, for example, in Shannon, R. R. et al: Applied Optics and Optical Engineering, Vol. VIII, pages 80-85, Academic Press, New York, 1980; and, Malacara, D., Optical Shop Testing, Chapter 14 and Appendix 4, John Wiley and Sons, New York, 1978.

SUMMARY OF THE INVENTION

As alluded to above, methods for assessing a surface figure may include such assessments of a primary mirror of a conventional telescope. The choice of a particular assessment methodology includes considerations of a particularly chosen telescope.

For example, it is known to employ an autocollimation assessing methodology to a Newtonian telescope (FIG. 1, numeral 10) comprising a paraboloidal primary mirror 12. As shown in FIG. 2, the autocollimation assessing method can be used to compare the FIG. 1 paraboloidal primary mirror 12 conic constant $k = -1.0$, to an idealized "aspheric departure", $k = 0$.

As a second example, it is also known to employ a surface figure assessing methodology to a Ritchey-Chrétein two mirror telescope 14 (FIG. 3) comprising a hyperboloidal primary mirror 16. Important such assessing methodologies for the telescope 14 include inter alia: (1) a conventional Foucault knife-edge test; (2) a Hartmann test; (3) a wire test; or (4), an interferometric test. For each such methodology, (and again, with reference to FIG. 2), one can compare a hyperboloidal primary mirror 16 conic constant $k_a$, to the idealized "aspheric departure", $k = 0$.

We now make the following critique of the preceding conventional methodology comprising aspheric departure, as it may be applied to an optical element comprising an hyperboloid, or, additionally, a prolate ellipsoid.

With reference to FIG. 2, we preliminarily note that the extant methodologies are based on a conceit of making an hyperboloid ($k < -1.0$) "look like" a sphere ($k = 0$) (i.e., traditional "aspheric departure"). However, by now referencing a FIG. 2 paraboloid ($k = -1.0$), we note, for the first time, that an aparaboloidal departure may be a more meaningful and suitable metric of testability for the hyperboloid or prolate ellipsoid, compared to an aspheric departure, since the paraboloidal surface topology may be observed to be geometrically closer to the hyperboloidal surface topology, than the spherical surface topology.

A critique of the conventional methodology comprising aspheric departure, for the case of an hyperboloid or prolate ellipsoid, follows accordingly: that it may be "harder" to make an hyperboloid look like a sphere compared to a paraboloid, thus disadvantageously requiring, for example, more testing lenses, and more severely shaped testing lenses, than a methodology which assesses an hyperboloid for its aparaboloidal departure.

These last points may be confirmed by reference to a Table set out in FIG. 4. The Table comprises computed and tabulated departures for two Ritchey-Chrétien hyperboloidal primary mirrors A,B, of first and second diameters, respectively; their departures relative to a best-fit sphere, and relative to a best-fit paraboloid.

The Table computations show that an aparaboloidal departure is a small percentage of the aspheric departure. That is, for the vast majority of Ritchey-Chrétien hyperboloidal primary mirrors comprising a conic constant k close to $k = -1.0$, the primary mirror is much closer to the paraboloid ($k = -1.0$), than to the sphere ($k = 0$). This suggests to us, that because the paraboloid has an ideal null test (the autocollimation configuration), an aparaboloidal departure may be a more meaningful assessing methodology for assessing a surface figure of an optical element, than heretofore comprehended.

Accordingly, based on these insights, we now disclose, first aspect, a novel method for assessing a surface figure of an optical element. The novel method, first aspect, comprises the steps of:

(a) subjecting the optical element to a classical collimation testing procedure for ascertaining its surface figure relative to a predetermined ideal;

the testing procedure characterized by a step of:

(b) modifying the classical optical testing procedure so that the optical element under test simulates a paraboloid.

The novel method, first aspect, compared to prior art methodologies, can realize important advantages, including inter alia:

1) providing simplification in the number of lenses required to employ an autocollimation method;
2) eliminating heretofore typically required severely shaped lenses;
3) providing an efficient capability for assessing a surface figure of larger, faster and more aggressive i.e., more aspheric optical elements; and
4) providing correction capabilities for better than 0.001 waves of visible light surface departure from ideal, for example, compared to prior art corrections frequently measured as 0.01 waves.

In a second aspect, and within a context of the first aspect, we now disclose a novel method for determining a vertex radius of curvature for an optical surface. The method comprises:

1) subjecting the optical surface to a classical collimation testing procedure, so that the optical surface simulates a paraboloid; and 2) subjecting the optical surface to a vertex focusing interferometric testing procedure, so that a vertex radius of curvature of the optical surface can be determined.

The invention, in its second aspect, complements and exploits the capabilities and advantages of the invention, first aspect. In particular, in the second aspect, attention is directed to a method for efficiently determining an actual vertex radius of curvature $R_a$, since, as alluded to above, this parameter can become an immediate and direct measure of a salient optical system parameter, viz., the wavefront focus error, $\Delta W$.

The invention in its second aspect can realize the following advantages, inter alia:

1) A flat mirror typically used to test a completed Ritchey-Chrétien or other telescope, may be used also to test a primary hyperboloidal (or prolate ellipsoidal) primary mirror of an uncompleted telescope, i.e., the invention makes use of an existing flat mirror.

2) Only one relatively small and easily manufactured single-element lens needs to be made for any one primary mirror design needing testing.

3) Test accuracy is enhanced because the amount of wavefront correction needed to be introduced by a corrector lens is a small percentage of the correction used for traditional correctors.

BRIEF DESCRIPTION OF THE DRAWING

The invention is illustrated in the accompanying drawing, in which:

FIG. 4 shows a Table comparing aparaboloidal departures versus aspheric departures for two Ritchey-Chrétien primary mirrors;

DETAILED DESCRIPTION OF THE INVENTION

We first turn our attention to preferred features of the method of the present invention, in its first aspect.

Preamble: A method for assessing a surface figure of an optical element.

The optical element may comprise a conventional lens, a conventional diffraction grating, or a conventional mirror, for example, a primary mirror of a Ritchey-Chrétien telescope.

The optical element may define a concave conicoid geometry, for example, an hyperboloid or a prolate ellipsoid. In a degenerate case, the optical element may define a paraboloidal geometry.

The surface figure (or topology) of the optical element may comprise, for example, a conic constant, k, typically specified, for example, as some such parameter as "k = −1.021", or, an algebraically related eccentricity, $\epsilon$.

Step A: Subjecting the optical element to a classical collimation testing procedure for ascertaining its surface figure relative to a predetermined ideal.

The classical collimation testing procedure may comprise inter alia:

1) a conventional Foucault knife-edge test;
2) a conventional Hartmann test;
3) a conventional wire test; or
4) a conventional interferometric test.

Step B: Modifying the classical optical testing procedure so that the optical element under test simulates a paraboloid.

Figure 1:
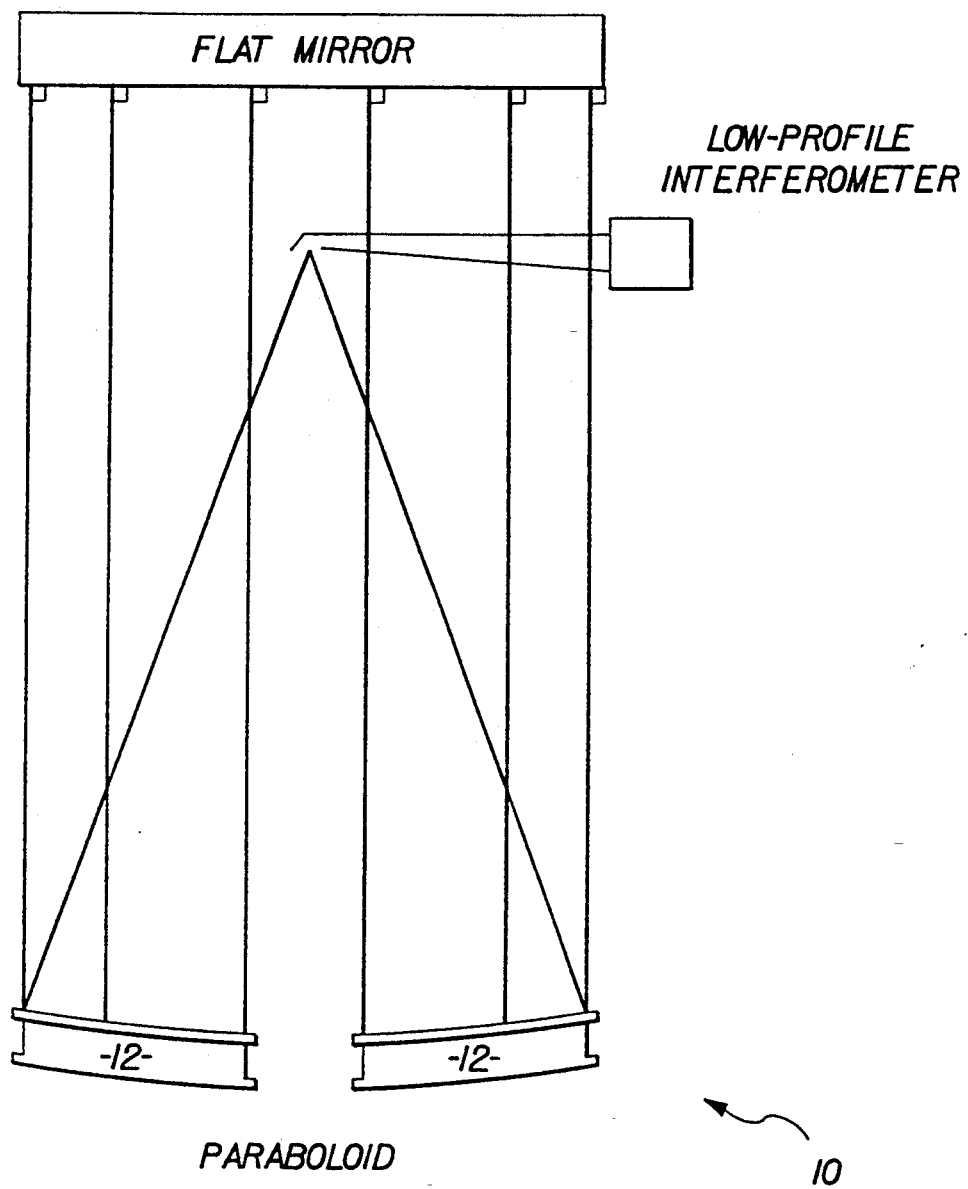
FIG. 1 shows a schematic of a Newtonian telescope primary mirror test configuration.
Figure 2:
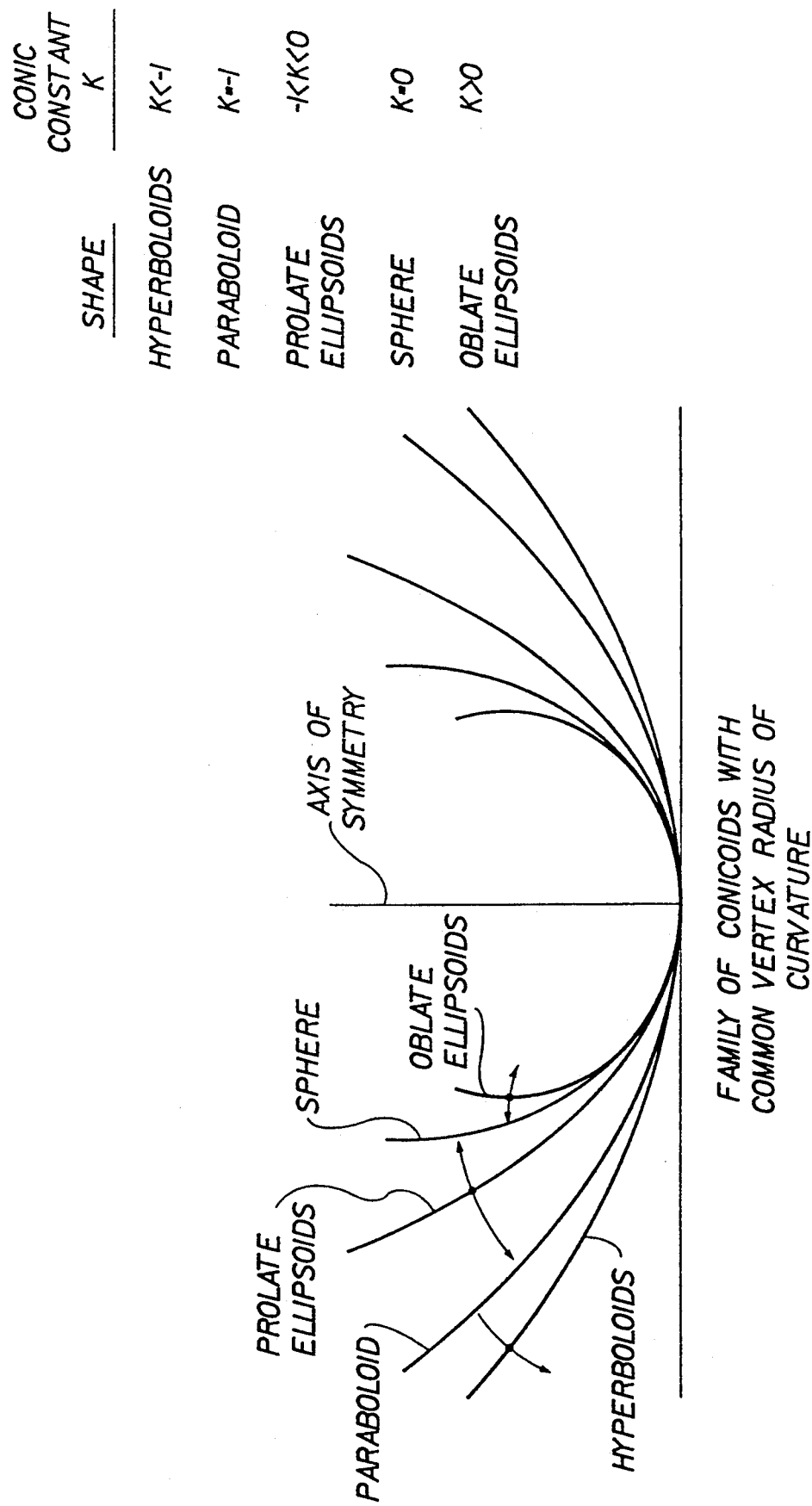
FIG. 2 shows a family of concave conicoids.
Figure 3:
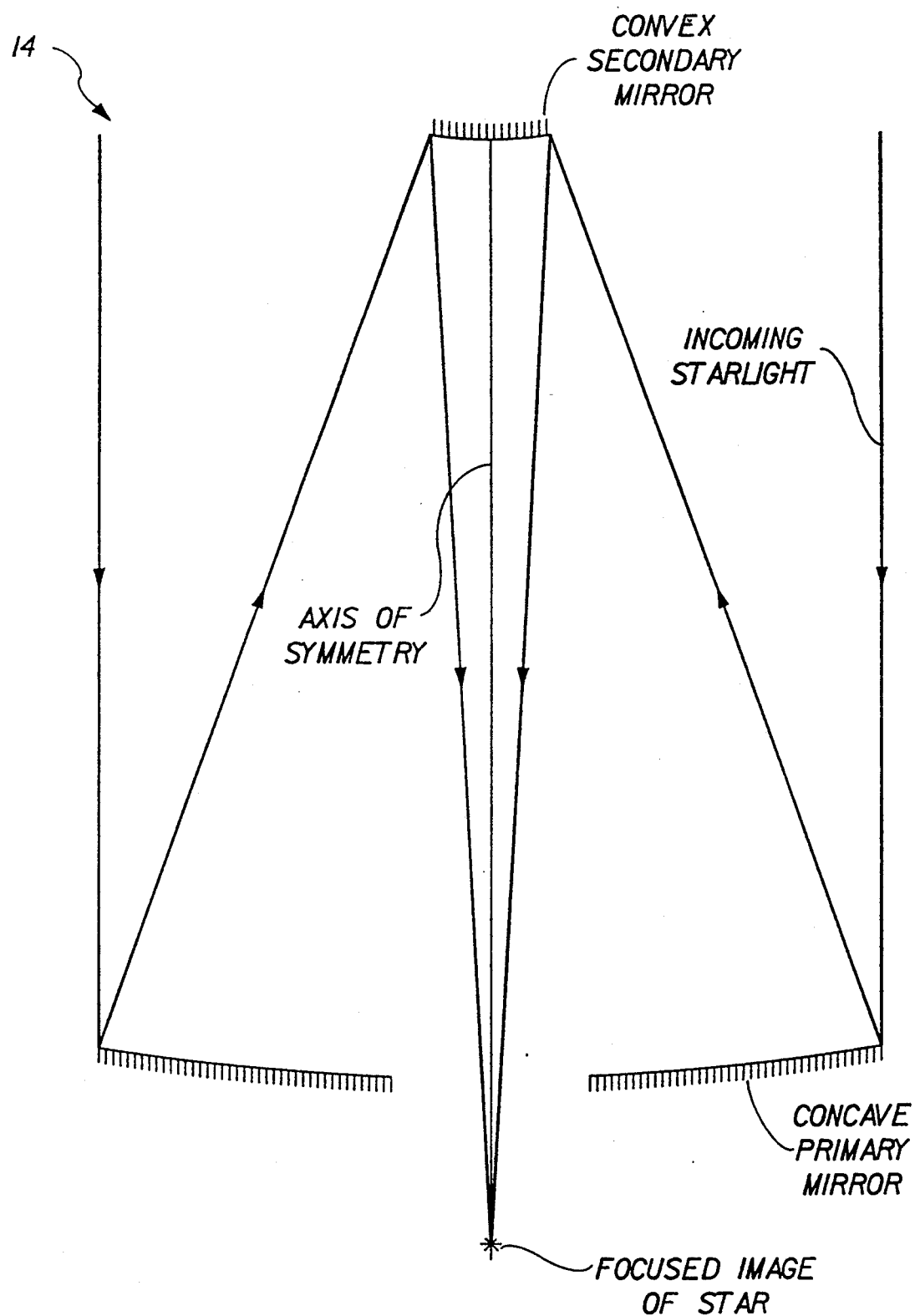
FIG. 3 shows a schematic of a Ritchey-Chrétien telescope.

Step B functions to qualify step A, thereby creating a pseudo-autocollimation test. The point of this qualification is to effect a suitable metric of testability of the optical element, so that its geometry may be referenced for its aparaboloidal departure (recall FIG. 2, supra), within the context, otherwise, of a classical optical testing procedure.

A preferred means for effecting such a pseudo-autocollimation test is set forth immediately below, (FIG. 5), in the context of an illustrative optical assembly 18 that may be employed to realize preferred steps of the method of the present invention.

Figure 5:
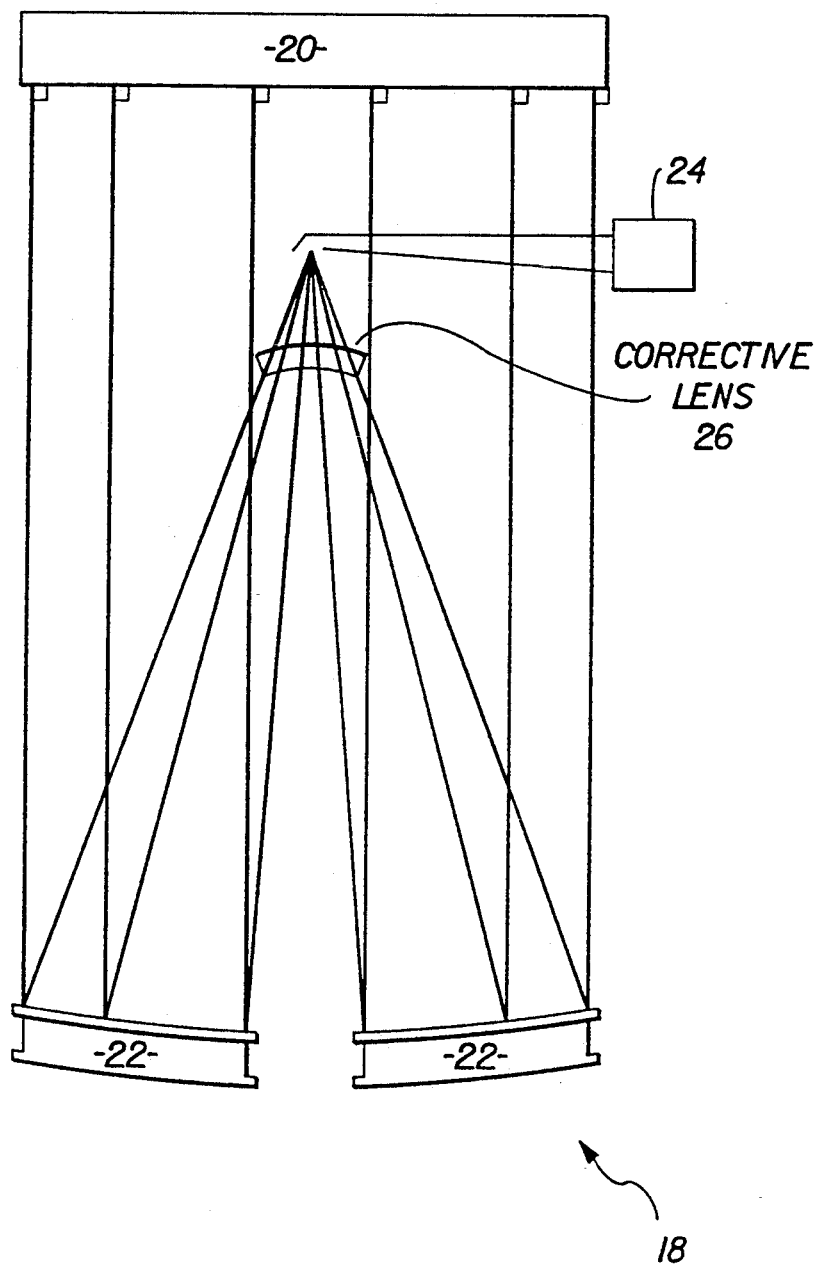
FIG. 5 shows an optical assembly that may be used to realize preferred steps of a first aspect of the present invention.

The FIG. 5 optical assembly 18 comprises a portion of a conventional Ritchey-Chrétien telescope, and includes a flat mirror 20, and an optical element 22 comprising a large primary mirror defining an hyperboloidal geometry. The optical assembly 18 also includes a low profile conventional interferometer 24, and a small single element refractive correcting lens 26. The correcting lens 26 is preferably optically designed to correct a relatively small amount of spherical aberration associated with a relatively small amount of aparaboloidal departure of the hyperboloidal primary mirror 22, relative to a best-fit paraboloid. Two examples of preferred such correcting lenses 26 are illustrated in FIGS. 6A,B, numerals 28, 30, corresponding to the Ritchey-Chrétien primary mirrors of FIG. 4, supra. An algorithm for designing a lens is disclosed in an Appendix, infra.

Figure 6B:
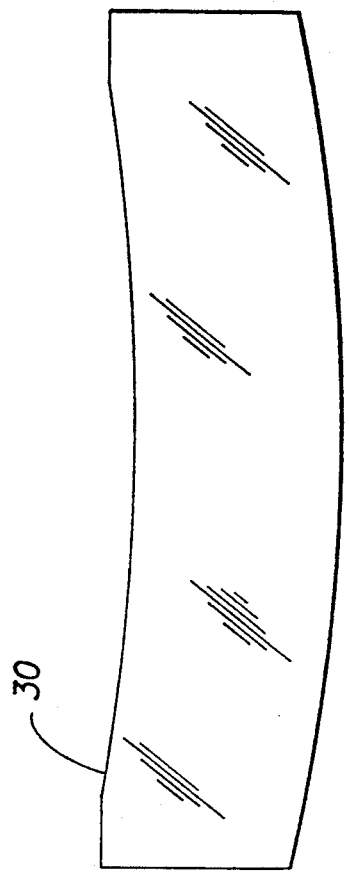
FIGS. 6 A,B show correcting lenses used in the present invention.
Figure 6A:
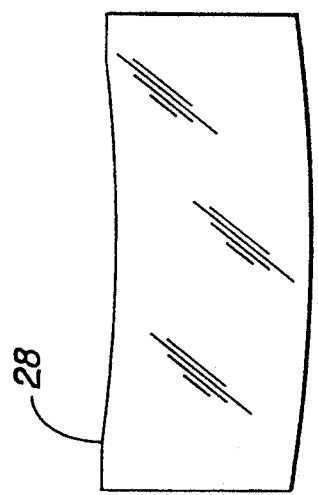

In operation, a FIG. 6 lens (28 or 30) is preferably located in the FIG. 5 optical assembly 18 between a focal point associated with a traditional classical test, (here, an inteferometric autocollimation test), of a best-fit paraboloid in the autocollimation configuration. The pseudo-autocollimation test now proceeds, consistent, otherwise, with classical steps, for assessing the surface figure of the optical element 22 as it simulates a paraboloid.

We now turn our attention to preferred features of the method of the present invention, in its second aspect for determining a vertex radius of curvature for an optical surface.

Step 1: Subjecting the optical surface to a classical collimation testing procedure, so that the optical surface simulates a paraboloid.

Step 1 is preferably realized in accordance with the above disclosure on the invention in its first aspect. Accordingly, Step 1 preferably incorporates by reference, and mutatis mutandis, the detailed description on the preamble and steps A, B, supra.

Step 2: Subjecting the optical surface to a vertex focusing interferometric testing procedure, so that a vertex radius of curvature of the optical surface can be determined.

Step 2 preferably is executed simultaneously with step 1.

Figure 7:
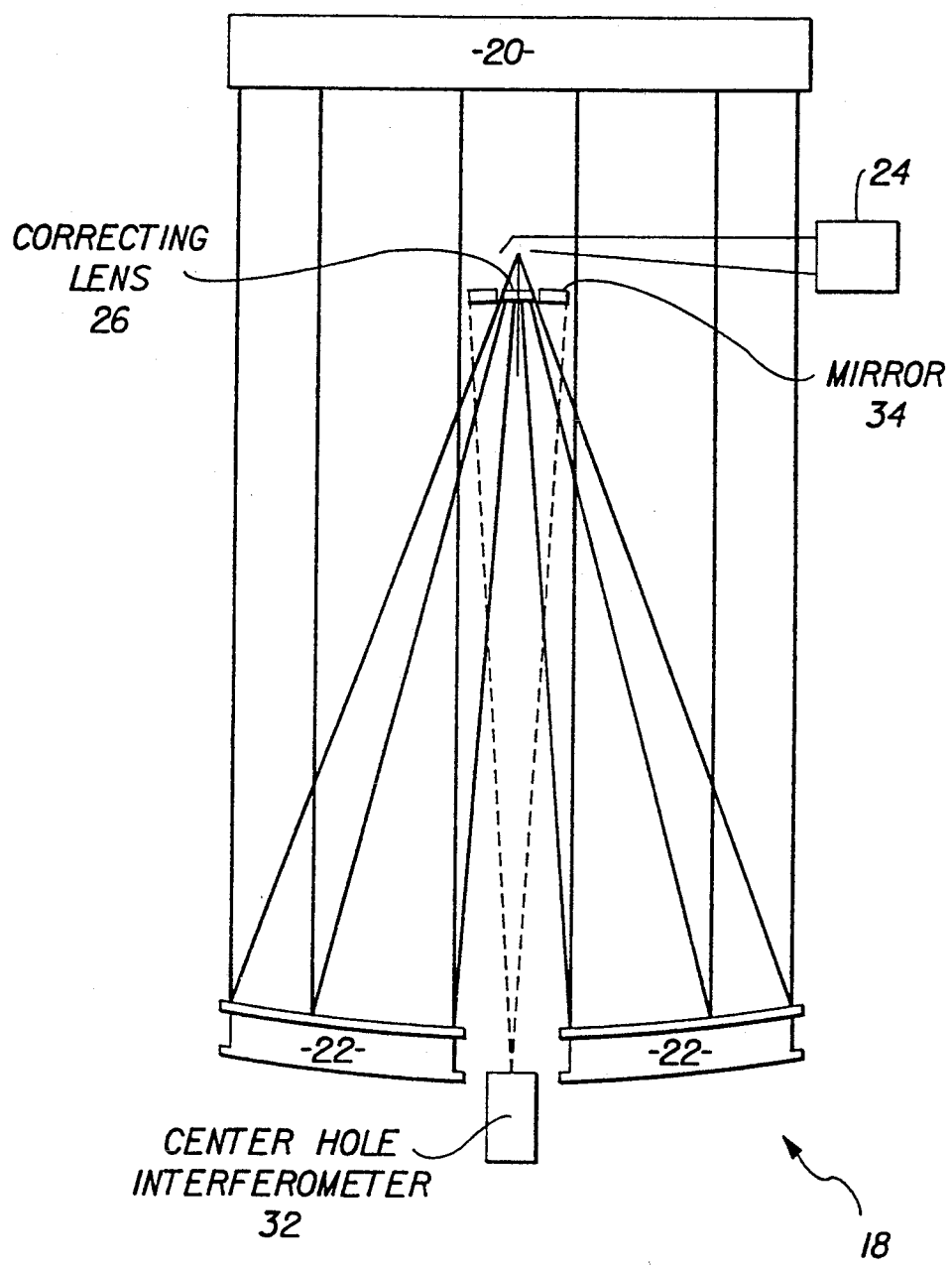
FIG. 7 shows an optical assembly that may be used to realize preferred steps of a second aspect of the present invention.

A preferred means for realizing step 2 is shown in FIG. 7, and comprises operation of a second interferometer 32. The second or lower interferometer 32 preferably inter-acts with a holding ring 34 comprising a concave annular spherical mirror, which holding ring 34, in turn, holds the correcting lens 26. In operation, the lower interferometer 32 acts to register the center of curvature of the mirror 34 so that it is coincident with the vertex of the optical surface 22. Restated, the tandem operation of the lower interferometer 32-holding ring 34 is that of providing a coincidence signature between the vertex of the optical surface 22 and the center of curvature of the spherical surface of the holding ring 34. In this manner, the vertex radius of curvature $R_o$ is determined.

APPENDIX

ALGORITHM FOR DESIGNING A REFRACTIVE LENS ELEMENT

A lens designer with access to a modern computerassisted lens design program, can find a determination of an appropriate lens for use in the pseudo-autocollimation test. Outlined below is a method used by the inventors, to generate lenses providing excellent correction (to better than 0.001 wavelength) of the hyperboloid mirror of FIG. 5.

Step 1 Select a material for a lens element. A common optical glass is appropriate, for example BK7 crown. An especially good choice is FSV fused silica which is thermally stable.

Step 2 Select a lens thickness. A good choice is likely to be between $\frac{1}{4}$ to 1 percent of the vertex radius of curvature of a mirror to be tested.

Step b 3 Select radii of curvature of the lens surfaces. A good choice is likely to be between 10 and 20 times the lens thickness. The lens surface toward the mirror to be tested is convex. The other surface of the lens is concave.

Step 4 Select a separation between the lens and the vertex of the mirror to be tested. A good choice is between 46 and 48 percent of the vertex radius of curvature of the mirror to be tested.

Step 5 Enter the mirror-lens configuration into a commercial computerized lens-design program such as Genii II or Code V.

Step 6 Simulate an axial point offset at infinite distance, projecting light parallel to the axis of symmetry of the mirror.

Step 7 Utilize the computer optimization software to vary the radii of the lens surfaces independently to minimize spherical aberration.

Step 8 Examine the lens size and shape. If it is undesirably large, the separation between mirror and lens can be increased. Returning to Step 5 should then result in a smaller lens. If the radii of the lens surfaces are too short, the thickness of the lens can be increased. Returning to Step 5 should then result in longer radii for the lens surfaces. A viable alternative to the detailed lens described, is especially appropriate if a Fizeau interferometer is to be used as part of the test set (e.g., a Zygo interferometer). In this case, the correcting lens may be placed farther from the optical surface to be tested, than half its radius of curvature. Note that in this case, the concave surface is toward the mirror under test.

What is claimed:

1. A method for determining a vertex radius of curvature for an optical surface, comprising:
   1) subjecting the optical surface to a classical collimation testing procedure, so that the optical surface simulates a paraboloid; and
   2) subjecting the optical surface to a vertex focusing interferometric testing procedure so that a vertex radius of curvature of the optical surface can be determined.

2. A method according to claim 1, comprising executing the steps 1 and 2 simultaneously.

3. A method according to claim 1, wherein step 1 further comprises the step of:
   inserting a correcting lens in a vicinity of a focal point defined by the collimation testing procedure.

4. A method according to claim 3, wherein step 2 further comprises the step of:
   inserting a holding ring, having a spherical mirror surface, that surrounds and holds the correcting lens, for providing a coincidence signature between the vertex of the optical surface and the center of curvature of the spherical mirror surface of the holding ring.

* * * * *